United States Patent [19]

Jacobs et al.

[11] 4,290,075
[45] Sep. 15, 1981

[54] OPTICAL RECORDING DEVICE HAVING SEVERAL ABLATIVE RECORDING LAYERS

[75] Inventors: Bernardus A. J. Jacobs; Adriaan W. De Poorter; Pieter Zalm, all of Eindhoven, Netherlands

[73] Assignee: U.S. Philips Corporation, New York, N.Y.

[21] Appl. No.: 58,213

[22] Filed: Jul. 16, 1979

[30] Foreign Application Priority Data

Apr. 2, 1979 [NL] Netherlands ......................... 7902542

[51] Int. Cl.$^3$ ........................ G01D 15/34; B32B 7/00; B32B 9/04
[52] U.S. Cl. .................................. 430/270; 428/913; 428/64; 428/520; 428/688; 428/699; 346/135.1; 430/321; 430/322; 369/13; 369/275; 369/284
[58] Field of Search ..................... 346/135.1; 428/209, 428/539, 913

[56] References Cited

U.S. PATENT DOCUMENTS

| | | | |
|---|---|---|---|
| 4,069,487 | 1/1978 | Kasai et al. | 346/135.1 X |
| 4,074,282 | 2/1978 | Balas Jr., et al. | 346/135.1 |
| 4,188,214 | 2/1980 | Kido et al. | 346/135.1 X |
| 4,214,249 | 7/1980 | Kasai et al. | 346/76 L |

FOREIGN PATENT DOCUMENTS 53-142307  6/1978  Japan .

Primary Examiner—George H. Miller, Jr.
Attorney, Agent, or Firm—Norman N. Spain

[57] ABSTRACT

The invention relates to an optical recording device having a substrate plate which is provided on at least one side with a first ablative recording layer and a second ablative recording layer provided hereon, the second ablative recording layer having a higher surface energy than the second ablative recording layer. Both recording layers preferably comprise the same common metal, for example tellurium.

11 Claims, 5 Drawing Figures

OPTICAL RECORDING DEVICE HAVING SEVERAL ABLATIVE RECORDING LAYERS

The invention relates to a device for the optical recording of information comprising a substrate plate having on at least one side an ablative recording layer which locally melts and forms holes as a result of exposure to laser light modulated in accordance with the information to be written.

Such a device is disclosed inter alia in German Auslegeschrift No. 25 14 678.

A thin metal layer, in particular a bismuth layer, is often used as an ablative recording layer. As compared with many other metals, bismuth has a comparatively low coefficient of reflection, a low coefficient of thermal conductivity and a low specific heat, so that upon radiation with laser light an energetically favourable heating and melting of the bismuth layer in the exposed places takes place.

According to the above-mentioned Auslegeschrift and for that matter also the U.S. Pat. No. 3,560,994, the quantity of laser light energy required to form a hole in the recording layer is reduced if the reflection of the recording layer is reduced by using an anti-reflection coating. According to the German Auslegeschrift a recording layer of Bi, Mn, Sn or Bi/In is used in combination with an anti-reflection layer of $Bi_2S_3$, $Sb_2S_3$ or Se.

It is stated in column 4, last paragraph, and column 5, first paragraph, of the above-mentioned Auslegeschrift that holes having a diameter of 6 μm are provided in the recording layer by exposure to an yttrium-aluminium laser having a pluse time of 30 ns. The laser light energy required to form a hole is 10–20 nJ.

It is an object of the present invention to provide an optical recording device of the kind mentioned in the opening paragraph in which information can be recorded and stored with a large information density while using a minimum quantity of laser light energy. A more particular object is to provide an optical recording device in which holes having minimum diametrical dimensions can be formed in the recording layer while using pulsated laser light, for example, holes having a diameter in the order of magnitude of tenth parts of a micron, in particular holes having a diameter from 0.1 to 1 μm.

According to the invention, these objects are achieved with a recording device of the above-mentioned kind which is characterized in that on its surface remote from the substrate the ablative recording layer has a second ablative recording layer which has a higher surface energy than the first recording layer, in which during operation of the device both recording layers melt and form liquid regions in the places exposed to laser light and furthermore as a result of mixing of the recording layers in the liquid regions a leap in the surface energy occurs at the circumferential edge thereof so that the molten recording material is drawn towards the circumferential edge, wets the solid surface of the second recording layer and a hole is formed.

The new recognition underlying the invention may be explained as follows.

In Applicant's opinion, in forming holes in an ablative recording layer with the use of pulsated laser light, an energy barrier has to be overcome in order to arrive—from the melting condition, i.e. the situation in which a liquid region has been formed in the recording layer under the influence of laser light—at the energetically more favourable hole condition, i.e. the situation in which the liquid material in the liquid region has retracted in the form of an edge while forming an aperture. This energy barrier, or in Applicant's terminology this hole-initiation energy, is comparatively high and in Applicants' opinion and according to Applicants' calculations based thereon cannot be overcome exclusively by thermal activation of the liquid region.

Experiments in which a recording layer of tellurium in a thickness of 40 nm provided on polymethylmethacrylate (PMMA) was exposed to pulsated laser light have demonstrated, for example, that the required laser light energy to form a hole is at least a factor 100 higher than the theoretically required quantity of energy to heat and melt a region of the recording layer having the size of the hole. This unbalance cannot be explained exclusively by conductivity losses.

The amount of the hole-initiation energy can be calculated to a good approximation with reference to a simplified model. According to this model, in forming a hole in a recording layer of thickness d, there is started from an initial situation in which a cylindrical liquid region of thickness d and radius R is present in the recording layer and from a final situation in which the liquid has retracted in the form of an edge while forming a hole of radius R and an annular liquid edge of circular cross-section of radius r.

The following equations and laws apply:

(a) The difference in energy level $\Delta E$ of the initial and final situations:

$$\Delta E = \pi R^2 (\gamma_L + \gamma_{LS} - \gamma_S) - 2\pi r \cdot 2\pi R \gamma_L \quad (1)$$

wherein $\gamma_L$ is the surface energy of the liquid, $\gamma_S$ is the surface energy of the substrate present below the recording layer, and $\gamma_{LS}$ is the interfacial surface energy of liquid and substrate.

(b) The interfacial surface energy is governed in casu by van der Waal's forces, so that $$\gamma_{LS} = (\gamma_L^{\frac{1}{2}} - \gamma_S^{\frac{1}{2}})^2 \quad (2)$$

(c) Law of conservation of matter which leads to:

$$\pi R^2 d = \pi r^2 \cdot 2\pi R \Longrightarrow r^2 = \frac{dR}{2\pi} \quad (3)$$

For the hole-initiation energy it holds that $\gamma E$ is maximum and hence $$\frac{\delta(\Delta E)}{\delta R} = 0,$$

so that it can be derived by means of the above-mentioned equations that:

$$E_{act} = \frac{27\pi^3 d^2 \gamma_L}{32\left(1 - \frac{\gamma_S^{\frac{1}{2}}}{\gamma_L^{\frac{1}{2}}}\right)^3} \quad (4)$$

$$\text{with } R = \frac{9\pi d}{8\left(1 - \frac{\gamma_S^{\frac{1}{2}}}{\gamma_L^{\frac{1}{2}}}\right)^2} \quad (5)$$

The hole-initiation energy of various optical recording devices can be computed by means of the above formula (4). For example, the hole-initiation energy of a 30 nm thick tellurium layer provided on a PMMA substrate is equal to $2.1 \times 10^{-4}$ Joule.

The initiation energy is much higher than the thermal energy k T, which latter has a value of $2.8 \times 10^{-20}$ Joule at 2000° K. It is hence not possible to make a hole in a liquid region of a recording layer exclusively by means of thermal activation.

Applicants have gained the further recognition that the hole-initiation energy is provided for a considerable part by the Marangoni-effect occurring in a liquid region of a recording layer. The Marangoni effect is a destabilization process which occurs in a liquid film which shows local variations in the surface energy in which as a result of the prevailing gradient in the surface energy a mass transport takes place towards those parts of the liquid film having the highest surface energy.

In a liquid region of very small dimensions formed in a recording layer by exposure to laser light a temperature profile prevails which results in a surface energy gradient. As a result of this a Marangoni mass transport occurs which promotes the hole opening. Experiments performed by Applicants in which a tellurium film provided on PMMA as exposed to laser light have demonstrated that the experimentally determined opening times to make a hole show a good correspondence to the opening times computed on the basis of the Marangoni-effect.

The measure according to the invention is based on the above-described recognition and is directed in particular to the intensification and the control of the Marangoni-effect occurring in a liquid region. By using the measure according to the invention a leap in the surface energy occurs along the circumferential edge of a liquid region in a recording layer the value of which depends on the composition of the respective ablative recording layers. Herewith a strong Marangoni-effect is produced which results in a radially directed strong mass transport which is optimum for hole opening. The achieved advantages are evident. First of all, less laser light energy is required to make a hole. A further important advantage is that the holes formed are better defined so that the signal-to-noise ratio upon reading the stored information is favourably influenced. A most interesting advantage is that the minimum hole dimensions are very small so that a high information density can be obtained.

This latter aspect can be explained as follows.

In applicant's opinion, the holes provided in a recording layer under the influence of laser light have certain minimum dimensions. The smaller the minimum hole diameter is, the higher the information density of the recorded information may be.

On the basis of the above-described simplified model of the hole-initiation in which no wetting of the solid recording layer parts with the liquid originating from the liquid region occurs, the minimum hole diameter can be calculated by means of the above given formulae (1), (2) and (3). In fact, for calculating the minimum hole diameter (R min) it holds that E=0, so that $$R_{min} = \frac{2\pi d}{\left(1 - \frac{\gamma_S^{\frac{1}{2}}}{\gamma_L^{\frac{1}{2}}}\right)^2} \quad (6)$$

By using the measure according to the invention a significant wetting occurs of the solid edge portions of the second recording layer situated around the liquid region.

In a corresponding manner as described above for the simplified model, the minimum hole diameter can also be calculated when wetting takes place.

In the case of a final situation in which a liquid rim is present around the hole and bears on the solid material with a semicircular profile, and furthermore the contact angle between liquid and solid is 90°, it can be derived that $$R_{min} = \frac{(\pi - 2)^2 d}{\pi\left(1 - \frac{\gamma_S^{\frac{1}{2}}}{\gamma_L^{\frac{1}{2}}}\right)^2} \quad (7)$$

For other final situations of hole formations also the minimum hole diameter can be calculated in a comparatively simple manner. For example, for a final situation in which the liquid from the liquid region has contracted in the form of a drop and bears on the second recording layer as a hemisphere, it holds that $$R_{min} = \frac{3d}{4\sqrt{2}\left(1 - \frac{\gamma_S^{\frac{1}{2}}}{\gamma_L^{\frac{1}{2}}}\right)^{3/2}} \quad (8)$$

also with a contact angle between liquid and solid of 90°. It can be derived from formulae 6, 7, 8 that in the case of wetting (formulae 7, 8) a smaller minimum hole diameter can be obtained than when no wetting takes place (formula 6).

The minimum hole diameter which can be achieved in the recording layers of the device according to the invention by exposure to laser light is very small and lies in the order of one or a few tenths of a micron. Upon exposure to laser light originating, for example, from a laser having a power of 4-6 mW, an emission wavelength of 850 nm and a pulse time of 100 ns, liquid regions of the above-mentioned small dimensions are first of all formed in the recording layers. The liquid in the exposed regions then moves in a radial direction under the influence of the intensified and directed Marangoni-effect. A hole is formed and the surface of the second recording layer which is situated around the liquid region and which is in air is wetted by the displaced liquid.

In a favourable embodiment of the device in accordance with the invention the substrate, on the side of the ablative recording layers, has a non-ablative covering layer which has a lower surface energy than the substrate.

With this embodiment a further reduction of the minimum hole diameter can be achieved, as may also be derived from the above formulae 7 and 8. In this connection it is to be noted that it appears from formulae 6, 7 and 8 that as an essential condition to obtain a hole it should apply that $\gamma_L$ is larger than $\gamma_S$. The surface energy of the liquid recording layer must thus be larger than the surface energy of the substrate.

In a further favourable embodiment of the device in accordance with the invention a transparent substrate is used which is provided on one side with recording layers and which on the side of the recording layers has an optically readable servo track which has at least partly a relief structure of servo regions situated alternately at a higher and a lower level. The servo track is usually spiral or constructed from concentric circles in which the servo regions situated alternately at a higher and a lower level give the track a crenellated profile. The longitudinal dimensions of the servo regions which show the form of blocks and pits vary in accordance with the stored servo data and are roughly from 0.3 to 3 μm. The difference in height between blocks and pits is a quarter wavelength of the laser light with which the servo track and the servo data are read optically in phase.

The device in accordance with the invention having a servo track has the significant advantage that the recording of information in the recording layers is accurately controlled by the servo data present in the servo track containing, for example, orders with respect to the speed of information recording and the location of recording. The laser light beam scanning the servo track via the transparent substrate, hereinafter also termed servo laser light, transmits the servo data to a control mechanism for a laser light beam of a significantly higher energy content with which the desired information can be written in the recording layers.

The recording of information preferably takes place in those parts of the recording layer which are situated on the servo track between the servo data.

The servo track may be provided in the surface of the substrate plate but may also be present in a layer of, for example, a synthetic resin, for example, a light-cured lacquer layer, provided on the surface of the substrate. A substrate which comprises a lacquer layer having the servo track may be manufactured, for example, by means of a matrix. For this purpose, a liquid, light curable lacquer is provided on a matrix surface which is provided with the servo track after which the transparent substrate plate is laid on it and the assembly is light-cured via the substrate plate, after which the substrate plate with the cured lacquer layer connected thereto and in which the servo track has been copied, is removed from the matrix surface. A substrate plate with provided servo track can be manufactured by means of a moulding, injection moulding or compression moulding process by means of a mould. If the device according to the invention comprises a covering layer, said layer is provided across the servo track.

In a preferred embodiment of the device according to the invention the surface energy of the second recording layer is at least 2% higher than that of the first recording layer, the thickness of the second recording layer being 1-20 nm and the first recording layer having a thickness of 10-100 nm.

It has been found that with the said minimum difference in surface energy good results, that is to say readily defined holes having small diameters, can still be obtained. It is presumed that in the liquid regions formed under the influence of laser light such a mixture of components occurs in both recording layers that the constituents having the lowest surface energy accumulate at the surface of the liquid region so that a favourable surface energy leap occurs at the interface between the liquid region and the second recording layer and hence a favourable Marangoni-effect.

In particular with volume ratios of first and second recording layer exceeding or equal to 5:1, the components of the first recording layer showing the lowest surface energy predominate at the surface of a liquid region.

In a further favourable embodiment of the device in accordance with the invention, first and second recording layer both comprise a metal, metal alloy or a chalcogenide glass. The layers may be provided, for example, by means of a vapour deposition process or by means of an electroless process from a liquid. Layers of metal or metal alloy are usually crystalline. Layers of a chalcogenide glass may be either amorphous or crystalline.

A chalcogenide glass is an alloy of Te with Se or of Te or Se with one or several metals selected from the group formed by As, Sb, Ge, Ga, In, Sn, Bi, Pb, Tl and S.

The said materials show a significant melting range. Readily defined liquid regions from which the holes are formed are obtained in the exposed places by exposure to pulsated laser light. Particularly suitable are materials having a low melting range, a high laser light absorption, a low specific heat and a comparatively low thermal conductivity.

The same common metal is preferably present in the first and second recording layer, in which furthermore first and/or second recording layers comprise additional components in such manner that the surface energy of the second ablative recording layer is higher than that of the first ablative recording layer.

On the basis of this, three favourable embodiments of the device in accordance with the invention may be distinguished.

In the first embodiment the second recording layer comprises, in addition to the common metal, one or several additional components having a higher surface energy than the common metal, and the first recording layer either comprises no additional components or one or several components the surface energy of which is smaller than that of the additional component(s) of the second recording layer.

In the second embodiment the second recording layer comprises, in addition to the common metal, one or several components having a lower surface energy than the common metal, and the first recording layer comprises one or several components having a lower surface energy than that of the component(s) of the second recording layer.

In the third embodiment, the second recording layer comprises no additional components and the first recording layer comprises one or several additional components having a lower surface energy than the common metal.

An extremely suitable common metal is tellurium.

In a preferred embodiment the first recording layer comprises, in addition to tellurium, also sulphur and/or selenium and the second recording layer comprises, in addition to tellurium, also selenium and/or bismuth in which, for the case in which both recording layers comprise, in addition to tellurium, only selenium, the weight concentration of selenium in the first recording layer is higher than that in the second recording layer.

In a further preferred embodiment the first and/or second recording layer also comprises antimony.

Very good results are obtained in particular with a device according to the invention in which the first ablative recording layer consists of a compound of the formula $Te_pSb_qSe_rS_s$
wherein
p has the value 20-70
q has the value 10-50
r has the value 5-40
s has the value 3-15, and
p+q+r+s32 100
and the second ablative recording layer consists of a compound of the formula $Te_xSb_ySe_z$ wherein
x has the value 20-97
y has the value 0-50
z has the value 3-50, and
x+y+z=100.

A number of example of combinations of first and second recording layers are recorded in the table below which can be used with good results in the device according to the invention.

TABLE

| number recording device | first recording layer thickness | composition | second recording layer thickness | composition |
|---|---|---|---|---|
| 1 | 30 nm | Te + 5% S | 10 nm | Te + 5% Se |
| 2 | 30 nm | Te + 10% S | 10 nm | Te + 5% Se |
| 3 | 30 nm | $Te_{33}Sb_{33}Se_{28}S_6$ | 10 nm | $Te_{33}Sb_{33}Se_{34}$ |
| 4 | 30 nm | $Te_{50}Sb_{17}Se_{28}S_5$ | 10 nm | Te + 5% Se |
| 5 | 30 nm | $Te_{50}Sb_{34}Se_{11}S_5$ | 10 nm | $Te_{50}Sb_{34}Se_{16}$ |
| 6 | 20 nm | $Te_3Sb_2Se$ | 10 nm | $Bi_2Te_3$ |

Upon writing information in the device in accordance with the invention, laser light pulsated in accordance with the information to be recorded is focused on the recording layer. The exposure of the recording layers may take place either from the air (air-incident) or via the substrate. In the latter case which is to be preferred the substrate must be transparent with respect to the laser light used and be provided with the recording layers on one side only.

A suitable transparent substrate is a glass plate or a disc of a transparent synthetic resin, for example, polymethylmethacrylate, polyalkylene, for example polyethylene, polyvinylchloride, polycarbonate. The substrate provides the necessary rigidity to the device in accordance to the invention. The substrate which is in the form of a disc has a thickness of one to a few millemetres and a diameter of roughly 5-50 cm. Upon writing and reading the device via the substrate the advantage is obtained that the dust particles, scratches, and the like present at the surface of the substrate fall beyond the depth of focus of the objective which focuses the laser light on the recording layers. Such dust particles and scratches then have no influence on the quality of the written and read information.

Furthermore the device in accordance with the invention is preferably read in reflection. In contrast with reading in transmission this has the advantage that the forward and reflected scanning laser light beams follow the same optical path to a considerable extent so that errors, if any, as a result of vibrations of the objective are partly compensated for and furthermore fewer optical elements such as objectives are necessary.

In a device in accordance with the invention having a servo track, the servo track is always read in reflection via the transparent substrate.

In a further favourable embodiment the device in accordance with the invention comprises an assembly of two transparent substrate plates each comprising on one side a first and second ablative recording layer, in which the second recording layer has a higher surface energy than the first recording layer and in which furthermore the recording layers of each substrate plate face each other and are connected together with the interposition of an annular spacer.

In this double embodiment of the device in accordance with the invention twice as large an amount of information can be stored. This means that with a diameter of 30 cm the device has a file storage capacity of 1 million A4 sheets.

The invention will now be described in greater detail with reference to the drawing, in which FIG. 1 is a cross-sectional view of a device according to the invention, prior to exposure;

Figure 1:
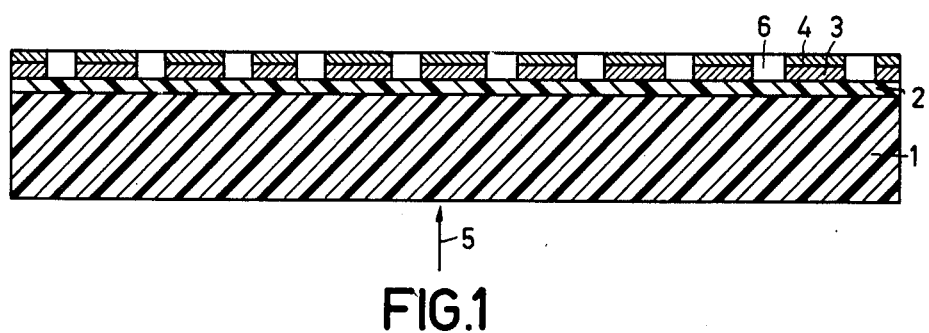

Reference numeral 1 in FIG. 1 denotes a 1 mm thick disc-shaped substrate plate of PMMA which is provided on one side with a covering layer 2 having a thickness of 0.05 µm. At its surface remote from the substrate the covering layer 2 has a first ablative recording layer 3 which in turn has a second ablative recording layer 4. For thickness and composition of the ablative recording layers reference may be made to the table incorporated in this specification. The recording layers 3 and 4 are exposed, via substrate plate 1 and in the direction denoted by an arrow 5, to pulsated laser light from a laser having a power of 4-6 mW, an emission wavelength of 850 nm and a pulse time of 100 ns. In the exposed places of recording layers 3 and 4, both layers melt and liquid regions are formed the liquid of which has a lower surface energy than the second recording layer. As a result of the surface energy leap prevailing at the circumferential edge of the liquid region a radially directed mass transport occurs in the liquid regions based on the Marangoni-effect. The liquid which is moved outwards radially wets the parts of the surface of the second recording layer 4 situated around the regions while forming an aperture 7 and a circular circumferential ridge 8.

Figure 2:
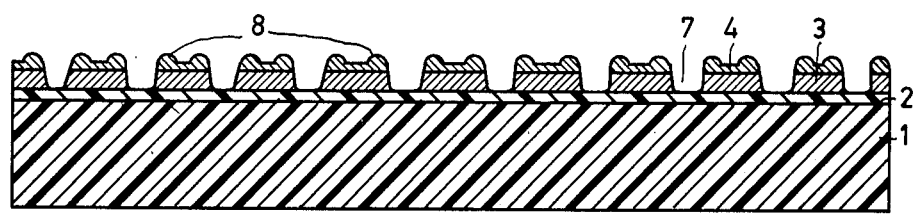
FIG. 2 is a cross-sectional view of the device shown in FIG. 1, after exposure.

This situation is shown in FIG. 2 in which the same reference numerals are used as in FIG. 1 for the same components. The diameters of apertures 7 vary with the compositions of the recording layers used and are roughly from 0.1 to 1 µ.

Figure 3:
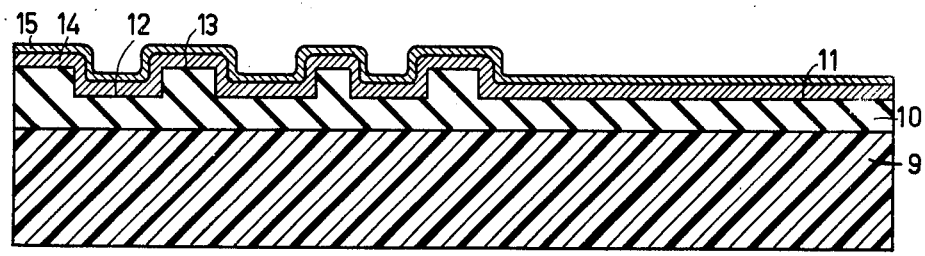
FIG. 3 is a tangential sectional view of a device according to the invention having a servo track, prior to exposure.

Reference numeral 9 in FIG. 3 denotes a 1 mm thick substrate plate of PMMA which is provided on one side with a light-cured lacquer layer 10 on the basis of acrylic acid esters having a servo track 11.

Figure 4:
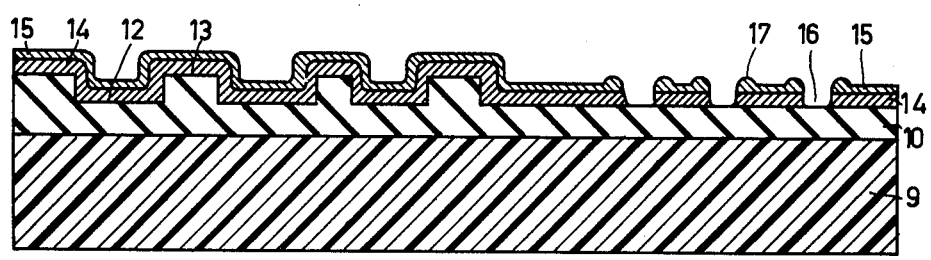
FIG. 4 is a tangential sectional view of the device shown in FIG. 3, after exposure.

Servo track 11 has a crenellated profile of servo regions 12 situated at a lower level and servo regions 13 situated at a higher level. The longitudinal dimensions of the regions 12 and 13 vary in accordance with the stored servo data comprising information as regards the speed and location of recording. The longitudinal dimensions are roughly 0.3-3 μm, while the difference in height between the regions 12 and 13 is approximately 0.2-0.3 μm. The lacquer layer 10 has a first ablative recording layer 14 which in turn is provided with a second ablative recording layer 15. For the composition and thickness of the recording layer reference is made to the above-mentioned Table. The servo track 11 is read in reflection with weak laser light via substrate 9. On the basis of the servo data, information is recorded by means of laser light of a larger power which is focused on the recording layers 14 and 15 via the substrate 9. The recording of information takes place in the part of the servo track 11 not provided with servo data. As a result of the exposure to the writing laser light, holes 16 are formed in the recording layers 14 and 15 and comprise a ridge 17 bearing on the surface of the recording layer 15 with a semicircular profile. This situation is shown in FIG. 4.

Figure 5:
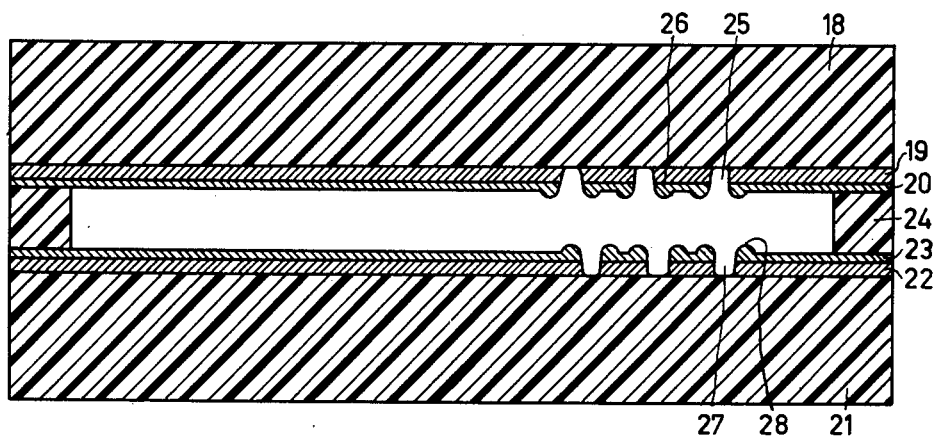
FIG. 5 is a cross-sectional view of a double embodiment of a device according to the invention.

Reference numeral 18 in FIG. 5 denotes a 1 mm thick substrate plate of polymethylmethacrylate which is provided on one side with a first ablative recording layer 19 and a second ablative recording layer 20. For thickness and composition of the recording layers reference is made to the Table recorded in the specification. A second substrate plate 21 of polymethylmethacrylate is also provided with a first ablative recording layer 22 and a second ablative recording layer 23. The thicknesses and compositions of layers 22 and 23 correspond to those of layers 19 and 20, respectively. Substrate plates 18 and 21 with the recording layers 20 and 23, respectively, face each other and are connected together in an airtight manner by a cylindrical spacer 24 manufactured from a synthetic resin, for example polyvinylchloride. For recording information, the recording device thus obtained can be exposed to pulsated laser light either via the plate 18 or via the plate 21. Holes 25 are formed in the recording layers 19, 20 and are surrounded by a ridge portion 26 formed from the molten recording layers 19, 20. Ridge portion 26 bears on the surface of the second recording layer 20 with a semicircular profile. The size of the holes 25 varies in accordance inter alia with the composition of the recording layers 19, 20 and the power, pulse time and beam diameter of the laser light used. In accordance with the desired information density and signal-to-noise ratio, holes having a diameter from 0.1 to 1 μm are provided. In a quite corresponding manner, holes 27 are provided in the recording layers 22, 23 by exposure to pulsated laser light via substrate plate 21. Holes 27 are also surrounded by a ridge 28.

What is claimed is:

1. A device for the optical recording of information comprising a substrate plate having on at least one side an ablative recording layer which locally melts and forms holes as a result of exposure to laser light modulated in accordance with the information to be written, characterized in that on its surface remote from the substrate the ablative recording layer has a second ablative recording layer having a higher surface energy than the first recording layer, in which during operation of the device both recording layers melt and form liquid regions in the places exposed to the laser light and furthermore as a result of mixing of the recording layers in the liquid regions, a leap in the surface energy occurs at the circumferential edge thereof so that the molten recording material is drawn to the circumferential edge, wets the solid surface of the second recording layer and a hole is formed.

2. A device as claimed in claim 1, characterized in that the surface energy of the second recording layer is at least 2% higher than that of the first recording layer, the thickness of the second recording layer being 1-20 nm and the thickness of the first recording layer being from 10-100 nm.

3. A device as claimed in claim 1, characterized in that first and second recording layers both comprise a metal, metal alloy or a chalcogenide glass.

4. A device as claimed in claim 1, characterized in that the device comprises an assembly of two transparent substrate plates each provided on one side with a first and a second ablative recording layer, in which the second ablative recording layer has a higher surface energy than the first recording layer and in which furthermore the recording layers of each substrate plate face each other and are connected together with the interposition of an annular spacer.

5. A device as claimed in claim 1, characterized in that on the side of the ablative recording layers the substrate has a non-ablative recording layer having a lower surface energy than the substrate.

6. A device as claimed in claim 1 or 5, characterized in that a transparent substrate having the recording layers on one side is used and is provided on the side of the recording layers with an optically readable servo track having at least partly a relief structure of servo regions situated alternately at a higher and a lower level.

7. A device as claimed in claim 1, characterized in that the same common metal is present in the first and the second recording layer, in which furthermore the first and/or second recording layer comprise additional components so that the surface energy of the second ablative recording layer is higher than that of the first ablative recording layer.

8. A device as claimed in claim 7, characterized in that the common metal is tellurium.

9. A device as claimed in claim 8, characterized in that the first recording layer comprises, in addition to tellurium, also sulphur and/or selenium and the second recording layer comprises, in addition to tellurium, also selenium and/or bismuth, in which for the case in which both recording layers comprise, in addition to tellurium, only selenium, the weight concentration of selenium in the first recording layer is higher than that in the second recording layer.

10. A device as claimed in claim 9, characterized in that the first and/or the second recording layer also comprise antimony.

11. A device as claimed in claim 10, characterized in that the first ablative recording layer consists of a compound of the formula $Te_pSb_qSe_rS_s$ wherein p has the value 20-70 q has the value 10-50 r has the value 5-40 s has the value 3-15, and $p+q+r+s=100$ and the second ablative recording layer consists of a compound of the formula $Te_xSb_ySe_z$ wherein x has the value 20-97 y has the value 0-50 z has the value 3-50, and $x+y+z=100$.

* * * * *